United States Patent [19]

Baretz et al.

[11] Patent Number: 4,859,369
[45] Date of Patent: Aug. 22, 1989

[54] USE OF WATER-SOLUBLE POLYMERS IN AQUEOUS CHEMICAL LIGHT FORMULATIONS

[75] Inventors: Bruce H. Baretz, New Canaan; William J. Trzaskos, Ridgefield, both of Conn.

[73] Assignee: American Cyanamid Company, Stamford, Conn.

[21] Appl. No.: 653,405

[22] Filed: Sep. 24, 1984

[51] Int. Cl.$^4$ .............................................. C09K 11/06
[52] U.S. Cl. ................................ 252/700; 252/186.28; 252/186.29
[58] Field of Search ................... 252/700, 186, 306.16

[56] References Cited

U.S. PATENT DOCUMENTS

| | | | |
|---|---|---|---|
| 3,392,123 | 7/1968 | Winberg | 252/700 |
| 3,691,085 | 9/1972 | Roberts et al. | 252/700 |
| 3,718,599 | 2/1973 | Rauhut | 252/700 |
| 3,816,325 | 6/1974 | Rauhut et al. | 252/700 |
| 3,994,820 | 11/1977 | Maulding et al. | 252/186.41 |
| 4,053,430 | 10/1977 | Mohan | 252/700 |
| 4,462,931 | 7/1984 | Cohen et al. | 252/186.29 |

FOREIGN PATENT DOCUMENTS 59263 1/1980 Israel.
8201713 11/1983 Netherlands.

*Primary Examiner*—Barry S. Richman
*Assistant Examiner*—T. J. Wallen
*Attorney, Agent, or Firm*—Frank M. Van Riet

[57] ABSTRACT

Aqueous chemiluminescent systems have been found to exhibit improved chemiluminescence due to the presence of minor amounts of a water-soluble polymer.

12 Claims, No Drawings

USE OF WATER-SOLUBLE POLYMERS IN AQUEOUS CHEMICAL LIGHT FORMULATIONS

BACKGROUND OF THE INVENTION

The invention described herein was made in the performance of work supported by the Office of Naval Research (Contract No. N-0014-82-C-0202).

CROSS-REFERENCE TO RELATED APPLICATION

This application is related to copending application Ser. No. 653,406 now abandoned and Ser. No. 653,404 filed of even date herewith, which disclose and claim the use of water-soluble polymers in conjunction with surfactants to increase the emission of chemiluminescent systems and the use of various acids to assist hydrogen peroxide release from solid hydrogen peroxide generators, respectively.

BACKGROUND OF THE INVENTION

The invention described herein was made in the performance of work supported by the Office of Naval Research (Contract No. N-0014-82-C-0202).

The generation of chemiluminescence by the reaction of an ester or amide of an oxalic acid with a source of hydrogen peroxide in the presence of a fluorescer compound in aqueous solution is disclosed and claimed in U.S. Pat. Nos. 4,053,430 and 4,282,357. Recently, U.S. Pat. No. 4,462,931 has issued which discloses an improvement over the previous systems whereby a surfactant is added in minor amounts to the aqueous solution, or to solid mixtures which are then mixed with water, in order to enhance the emission intensity of the resultant system. While the use of a surfactant in such systems has enhanced the emission intensity thereof, industry is still continuously on the lookout for ways and means of further enhancing the emission intensities, light capacities and efficiencies of chemiluminescent systems.

SUMMARY OF THE INVENTION

It has now been found, in accordance with the present invention, that the emission intensities of chemiluminescent systems based on oxalic acid esters or amides, fluorescers and a source of hydrogen peroxide can be materially enhanced by the incorporation of minor amounts of a water-soluble polymer into an aqueous solution containing these ingredients or solid mixtures thereof which may be added to water to generate chemiluminescense. The water-soluble polymers are more effective in this regard than the surfactants described in U.S. Pat. No. 4,462,931 alone in that the quantum yield of light emitted is 15–35% higher when the polymers are employed vis-a-vis the surfactants.

The employment of polymeric additives in organic solvent based chemiluminescent systems is disclosed in U.S. Pat. Nos. 3,377,291; 3,816,325 and 3,994,820. The compositions produced in U.S. Pat. No. 3,377,291 are, however, gels which may be used to spread on porous cloth etc. wherein the polymer functions as a thickening agent. In U.S. Pat. No. 3,816,325 polymeric materials are employed so as to render the final composition immune to adverse environmental conditions such as water. Additionally, the materials can be formulated into a dry system which will not be absorbed into porous surfaces or can be molded into specific shapes. There is no evidence, however, that the presence of the polymeric additive enhances the ultimate emission intensities of either of the systems. In U.S. Pat. No. 3,994,820, the light capacity of organic oxylate ester chemiluminescent systems is increased by the addition of certain polymeric materials to the system. These polymers include homopolymers and copolymers of (a) poly(alkylene oxides), (b) poly(vinylalkylethers and esters), and (c) maleic anhydride and cellulose esters whereas the polymers useful in the present invention exhibit high binding capacity, in aqueous solution, especially for substrates that possess negative charges, and function, in the present invention, in that manner. The function of the polymers in the organic systems is unknown.

DESCRIPTION OF THE INVENTION INCLUDING PREFERRED EMBODIMENTS

In accordance with the present invention, there is provided a composition for generating chemiluminescent emission comprising an aqueous solution of (a) a water-soluble reactant, (b) a water-soluble organic fluorescer having a spectral emission in the rage from about 330 to 1000 nanometers, and (c) a water-soluble polymer, in proportions capable of producing enhanced chemiluminescence on reaction with hydrogen peroxide.

The present invention further provides a dry composition for generating chemiluminescence comprising a dry mixture of (a) a water-soluble reactant, (b) a solid hydrogen peroxide source e.g. sodium perborate, potassium perborate, sodium carbonate peroxyhydrate, histidine perhydrate, etc., (c) a solid water-soluble fluorescer having a spectral emission in the range from about 330 to 1000 nanometers, and (d) a water-soluble polymer, in proportions capable of producing enhanced chemiluminescence when added to water.

In the above compositions the reactant is preferably a water-soluble ester, or amide, of oxalic acid.

The present invention also provides processes for generating chemiluminescence by adding effective amounts of the aforedescribed dry compositions to water or adding to the aqueous solutions an aqueous solution of hydrogen peroxide, or source of hydrogen peroxide.

The aqueous chemiluminescent systems of the present invention provide enhanced emission of light which is useful in a wide variety of applications, particularly for providing emergency light at home, on highways, and at sea.

The chemiluminescent reaction mixture contains a water-soluble reactant which generates light by reacting with hydrogen peroxide, or a source of hydrogen peroxide, in the presence of a fluorescer compound and a water soluble polymer.

Suitable water-soluble esters of oxalic acid which may be used in the present invention as reactants are disclosed by Mohan in U.S. Pat. No. 4,053,430, discussed above and incorporated herein by reference.

Illustrative examples of suitable water-soluble esters of oxalic acid include the dihydrochlorides, dihydrobromides, dihydrofluorides, di(trifluoromethane) sulfonates, dimethanesulfonates, di-p-toluenesulfonates, dimethosulfates and diquaternary ammonium salts of the following compounds:

bis(2,6-dichloro-4-[(2-dimethylaminoethyl)methylsulfamoyl]-phenyl)-oxalyate.

bis(2,4-dichloro-6-[(2-dimethylaminoethyl)methylsulfamoyl]-phenyl)-oxalate.

bis(2-chloro-4-[(2-dimethylaminoethyl)methylsulfamoyl]phenyl)oxalate.
bis(2-bromo-4-[(2-dimethylaminoethyl)methylsulfamoyl]phenyl)oxalate.
bis(2,6-dibromo-4-[(2-dimethylaminoethyl)methylsulfamoyl]phenyl)oxalate.
bis(3-fluoro-4-[(2-dimethylaminoethyl)methylsulfamoyl]phenyl)oxalate.
bis(2,4-dibromo-6-[(2-dimethylaminoethyl)methylsulfamoyl]phenyl)oxalate.
bis(2-fluoro-4-[(2-dimethylaminoethyl)methylsulfamoyl]phenyl)oxalate, and the like.

The preferred water-soluble ester of oxalic acid is the dihydrochloride of bis(2,4-dichloro-6-[(2-dimethylaminoethyl)methylsulfamoyl]phenyl)oxalate.

Suitable water-soluble amides of oxalic acid which may be used in the processes and compositions of this invention are disclosed in U.S. Pat. No. 4,282,357 and in U.S. Pat. No. 4,338,213.

Illustrative examples of suitable water-soluble amides of oxalic acid include the dihydrochlorides, dihydrobromides, dihydrofluorides, di(trifluoromethane) sulfonates, dimethanesulfonates, dimethosulfates, and ditetrafluoroborates of the following compounds:
N,N'-bis(2-morpholinoethyl)-N,N'-bis-(trifluoromethylsulfonyl)oxamide,
N,N'-bis(3-morpholinopropyl)-N,N'-bis(trifluoromethylsulfonyl)oxamide,
N,N'-bis[2-(2-pyridyl)ethyl]-N,N'-bis(trifluoromethylsulfonyl)oxamide,
N,N'-bis[3-(2-pyridyl)propyl]-N,N'-bis(trifluoromethylsulfonyl)oxamide,
N,N'-bis(6-morpholinohexyl)-N,N'-bis(trifluoromethylsulfonyl)oxamide,
N,N'-bis[2-(4-pyridyl)ethyl]-N,N'-bis(trifluoromethylsulfonyl)oxamide,
N,N'-bis[5-(3-pyridyl)pentyl]-N,N'-bis(trifluoromethylsulfonyl)oxamide, and the like.

The preferred water-soluble oxamide is 4,4'-(oxalylbis[[(trifluoromethyl)sulfonyl]imino]ethylene)bis(4-methylmorpholinium trifluoromethanesulfonate).

The water-soluble fluorescer compounds, useful in the chemiluminescent compositions of this invention, may be defined broadly as compounds, having an emission spectral maximum between 330 and 1000 nanometers, which do not react with a hydrogen peroxide compound, or the amide, or ester, of oxalic acid, on contact. The watersoluble fluorescer may be anionic, cationic, or nonionic.

Illustrative examples of suitable fluorescers including the following:
Sulfonated 5,6,11,12-tetraphenylnaphthacene sodium salts, 4-methyl-4-[2-[1-oxo-4-(1-pyrenyl)butoxy]ethyl]morpholinium methyl sulfate,
4,4'-[9, 10-anthracenediylbis(1, 2-ethanediyl)]bisbenzenesulfonic acid disodium salt,
4,4'-[9,10-anthracenediylbis(1,2-ethanediyl)]bisbenzenemethan anol bis(monosodium sulfate).
4,4'-[9, 10-anthracenediylbis(1, 2-ethynediyl)]bisbenzenecarboxylic acid dilithium salt,
4,4'-[6, 12-diphenyl-5, 11-tetracenediylbis(4, 1-phenylenemethylene)bis (4-methylmorpholinium methyl sulfate),
4,4'-[6, 12-diphenyl-5, 11-tetracenediylbis(4, 1-phenylenemethylene)]bis (4-trifluoromethylmorpholinium trifluoromethyl sulfate),
2, 8-bis[3, 6, 9-trioxadecyl)olyl)-5, 11-bis[[3, 6, 9-trioxadecyl)oxy]phenyl]-6, 12-diphenylnaphthacene, and the like; see also U.S. Patent No. 4,366,079.

The preferred water-soluble fluorescer, referred to herein as sulfonated rubrene, is a mixture of sodium salts of sulfonated 5,6, 11, 12-tetraphenylnaphthacene.

Illustrative examples of suitable fluorescers which are not water-soluble include the following compounds:
5, 6, 11, 12-tetraphenylnaphthacene,
9, 10-bis(phenylethynyl)anthracene,
5, 12-bis(phenylethynyl)tetracene,
9, 10-diphenylanthracene,
perylene,
pyrene,
1-chloro-9, 10-bis(phenylethynyl)anthracene,
2-chloro-9, 10-bis(phenylethynyl)anthracene,
1, 5-dichloro-9, 10-bis(phenylethynyl)anthracene,
1, 8-dichloro-9, 10-bis(phenylethynyl)anthracene,
1-bromo-9, 10-bis(phenylethynyl)anthracene,
1-fluoro-9, 10-bis(phenylethynyl)anthracene,
2-methyl-9, 10-bis(phenylethynyl)anthracene,
fluorescein,
rhodamine,
2, 3-benzanthracene,
5, 11-bis(4-(n-hexyl)phenyl)-6, 12-diphenylnaphhhacene,
5, 11-bis[4-(n-dodecyl)phenyl]-6, 12-diphenylnaphthacene,
5, 11-bis[4-(2, 5, 8, 11, 14, 17-hexaoctadec-1-yl)phenyl]-6, 12-diphenylnaphthacene, and the like.

Any water-soluble polymer may be employed to produce the novel compositions of the present invention. Examples of suitable polymers falling within the scope of the present invention include the polymerization products of alkylene oxides such as ethylene oxide, propylene oxide, hexylene oxide and mixtures thereof; polymers of vinyl acetate; polymers of vinyl pyrrolidone alone or as copolymers with comonomers such as vinyl acetate, etc.; polyvinyl pyridenes, polystyrene sulfonates, polyacrylamides copolymers thereof, and the like.

The molar concentrations (moles per liter of solution) of the reactant e.g. the oxalic acid ester, or amide, may vary considerably. It is only necessary that it be present in sufficient concentration to obtain chemiluminescence. The initial molar concentration is in the range of $10^{-3}$ to 5, preferably about $10^{-2}$ to 1.0.

The molar concentration of the fluorescer compound used is about $10^{-5}$ to 1, preferably about $10^{-3}$ to $10^{-1}$. The initial molar concentration of the hydrogen peroxide compound used is from about $10^{-3}$ to 10.0, preferably about $10^{-1}$ to 4.0. The mole ratio of hydrogen peroxide to reactant used ranges from about 0.5 to 100, preferably about 20 to 60.

The amount of water-soluble polymer employed should range from about $10^{-2}$ to about 50 percent by weight, based on the total weight of the solution. When dry admixtures are prepared, the amounts of the ingredients should vary such that they fall within the above ranges when added to water.

The ingredients of the chemiluminescent compositions of this invention are kept separated until chemiluminescence is desired, when they may be admixed in a single step or in a series of steps. The order of admixing of the ingredients is usually not critical. The hydrogen peroxide compound, polymer and fluorescer compound may be dissolved in water and the reactant, added thereto as a solid, or in a suitable inert diluent, to initiate chemiluminescence. Alternatively, the reactant, polymer and fluorescer compound may be dissolved in water, and the hydrogen peroxide compound added thereto to initiate chemiluminescence. Optionally, a solution of the hydrogen peroxide compound in water may be added to a solid mixture of reactant, polymer and fluorescer compound to initiate chemiluminescence.

An illustrative example of a suitable dry mixture contains the following: 13.23%, by weight, of 4,4'-(oxalyl-bis (trifluoromethylsulfonyl)imino)ethylene)bis(4-methyl-morpholinium trifluoromethanesulfonate), 2.12%, by weight of sulfonated rubrene, 1.0% by weight of poly(vinyl pyrrolidone) and 83.65% by weight of sodium perborate. nyl pyrol i If the fluorescer compound is water-insoluble, such as rubrene, it may be dissolved in a suitable inert water-immiscible organic solvent, such as cyclohexane, and the solution added to an aqueous mixture of a hydrogen peroxide source, an effective amount of a polymer and a water-soluble reactant to produce a chemiluminescent emulsion.

The hydrogen peroxide source employed in the compositions and processes of this invention may be an aqueous solution of hydrogen peroxide per se, or a solid hydrogen peroxide-producing compound, such as sodium perborate, potassium perborate, sodium carbonate peroxhydrate, histidine perhydrate, and the like. When a solid hydrogen peroxide-producing compound is used, it is preferred that an acid having a pKa of from about 1–5 also be added to assist in the hydrogen peroxide generation in amounts equivalent to the amount of solid hydrogen peroxide-producing compound used. Preferred acids are the solid polycarboxylic acids such as oxalic acid, tartaric acid, citric acid, malonic acid, tricarballylic acid, adipic acid, citraconic acid, fumanic acid, glutaric acid, maleic acid, malic acid, malonic acid, succinic acid, phthalic acid and the like.

The following examples are set forth for purposes of illustration only and are not to be construed as limitations on the present invention except as set forth in the appended claims. All parts and percentages are by weight unless otherwise specified.

EXAMPLE 1

An aqueous solution containing 0.01 mole/liter of 4,4'-[oxalylbis[(trifluoromethylsulfonyl)imino]ethylene]-bis[4-methylmorpholinium trifluoromethanesulfonate], hereafter referred to as METQ, is mixed with 1% of poly(vinylpyrrolidone) and 0.005 mole/liter of the fluorescer rubrene sulfonate. Aqueous hydrogen peroxide is then added. The emission intensity is then measured at the wavelength of maximum emission by means of a spectroradiometer-luminometer similar to that described by Roberts and Hirt [Appl. Spectrosc., 21, 250 (1967)] modified with a Jarrell-Ash Model 82-410 grating monochromator and an RCA C31034 photomultiplier with a gallium arsenide photocathode operated at 1300 V with dry ice cooling. Raw data are recorded digitally on a Hewlett-Packard 5150A thermal printer. Spectral response is corrected by calibration against a standard tungsten lamp. Absolute light intensities are obtained by deriving calibration constants based on the accepted fluorescence quantum yield (0.55) for quinine sulfate, as reported by Melhuish (N.Z. Sci. Tech., B, 37, 142 (1955)], in 0.N $H_2SO_4$, and by ferrioxalate actinometry [Hatchard et al., Proc. R. Soc. London, Ser. A, 235, 518 (1956)] of the exciting light.

The light capacity (the light output in lumen hours per liter of emitting solution) is related to the chemiluminescence brightness and lifetime as described in U.S. Pat. No. 3,816,326.

Chemiluminescence percent quantum yields mole of reactant ×100) are calculated by (einsteins per monitoring the intensity decay at the emission maximum and calculating the intensity at each time interval in einsteins per second from the chemiluminescence spectrum. Chemiluminescence spectra are then corrected for intensity decay. The total area under the decay curve is calculated by using a combination of a Simpson's rule integration and an exponential extrapolation to infinite time as described by Roberts and Hirt. Data are processed by a Digital Equipment Corp. PDP-11/40 computer.

A comparison determination is also carried out, in the manner described above, without the polymer. The results obtained are shown below in Table I.

TABLE I

| Relative Chemical Light Yield | |
|---|---|
| Product of Example 1 | 0.13 |
| Product of Example 1 without Polymer | 0.05 |

EXAMPLE 2

The procedure of Example 1 is again followed except that trisodium-8-hydroxy-1,3,6-pyrenetrisulfonate is used in place of the METQ. Similar results are obtained.

EXAMPLE 3

The replacement of the METQ of Example 1 by 2,2'-[oxalyl bis[[(trifluoromethylsulfonyl)imino]ethylene]]bis[1-methyl-pyridinium trifluoromethanesulfonate]again results in an increase in the relative chemical light yield as compared to a similar composition without.

EXAMPLE 4

Following the procedure of Example 1, except that rubrene sulfonate is replaced by rubrene, similar results are achieved.

EXAMPLE 5

The METQ of Example 1 is replaced by 4-methyl-[1-oxo-4-(1-pyrenyl) butoxy]ethyl]morpholinium methyl sulfate. Similar improved results are observed.

EXAMPLE 6

Example 1 is again followed except that the METQ is replaced by bis(2,4-dichloro-6- [(dimethylaminoethyl) methylsulfamoyl]phenyl) oxylate. Again, increased relative chemical light yield is realized.

EXAMPLE 7

The bis(tetramethylammonium) salt of bis(2,3,6-trichloro-4-sulfophenyl) oxalate is used to replace METQ in accordance with Example 1. Excellent results are achieved.

EXAMPLE 8

The poly(vinylpyrrolidone) of Example 1 is replaced by a copolymer of vinylpyrrolidone and vinyl acetate (60/90). Excellent results are achieved.

EXAMPLE 9

A polyethyleneoxide-polypropyleneoxide copolymer is used to replace the polymer of Example 1. Results are equivalent.

EXAMPLE 10

When the polymer of Example 1 is replaced by poly(styrene sulfonate), excellent results are obtained.

EXAMPLE 11

Polyacrylamide is used to replace the polymer of Example 1 with equivalent results.

EXAMPLE 12

A solid mixture is prepared by blending the METQ, poly(vinylpyrroidone) and rubrene sulfonate of Example 1 together with solid sodium perborate and an equivalent amount of oxalic acid. Addition of the solid mixture to water substantially immediately produces a strong colored light.

We claim:

1. A composition for generating chemiluminescence comprising, in aqueous solution,
   (a) $10^{-3}$ to 5 molar concentration of a water-soluble reactant which generates light by reaction with hydrogen peroxide,
   (b) $10^{-5}$ to 1 molar concentration of a water-soluble or water-dispersible organic fluorescer having spectral emission in the range about 300 to 1000 nanometers and
   (c) from about $10^{-2}$ to about 50%, by weight, based on the total weight of the solution, of a water-soluble polymer.

2. A composition according to claim 1 wherein the reactant is 4,4'-[oxalylbis[(trifluoromethylsulfonyl) imino]ethylene]bis[4-methylmorpholinium trifluoromethane sulfonate].

3. A composition according to claim 1 wherein the fluorescer is sulfonated rubrene.

4. A composition according to claim 1 wherein the polymer is poly(vinyl pyrrolidone).

5. A composition according to claim 1 wherein the polymer is a copolymer of vinyl pyrrolidone and vinyl acetate.

6. A dry mixture of components for making a chemiluminescent reaction by addition of the dry mixture to water, said dry mixture comprising,
   (a) a water-soluble reactant which generates light by reaction with hydrogen peroxide,
   (b) a water-soluble or water-dispersible organic fluorescer having spectral emission in the range of from about 300 to about 1000 nanometers,
   (c) a water-soluble polymer and
   (d) a solid hydrogen peroxide source.

7. A mixture according to claim 6 wherein the reactant is 4,4'-[oxalylbis[(trifluoromethylsulfonyl) imino]ethylene]bis[4-methylmorpholinium trifluoromethanesulfonate].

8. A mixture according to claim 6 wherein the fluorescer is sulfonated rubrene.

9. A mixture according to claim 6 wherein the polymer is poly(vinylpyrrolidone).

10. A mixture according to claim 4 wherein the polymer is a copolymer of vinyl pyrrolidone and vinyl acetate.

11. A method for producing chemiluminecence comprising dispersing a dry mixture in water, said dry mixture comprising:
    (a) a water-soluble reactant which generates light by reaction with hydrogen peroxide,
    (b) a water-soluble or water-dispersible organic fluorescer having spectral emission in the range of from about 300 to about 1000 nanometers,
    (c) a water-soluble polymer and
    (d) a solid hydrogen peroxide source.

12. A method for producing chemiluminescence comprising combining a composition with hydrogen peroxide or a source of hydrogen peroxide in aqueous solution, said composition comprising, in aqueous solution:
    (a) $10^{-3}$ to 5 molar concentration of a water-soluble reactant which generates light by reaction with hydrogen peroxide,
    (b) $10^{-5}$ to 1 molar concentration of a water-soluble or water-dispersible organic fluorescer having spectral emission in the range of from about 300 to 1000 nanometers, and
    (c) from about $10^{-2}$ to about 50%, by weight, based on the total weight of the solution, of a water-soluble polymer.

* * * * *